(12) United States Patent
Fahlbusch et al.

(10) Patent No.: US 11,537,437 B2
(45) Date of Patent: Dec. 27, 2022

(54) EXECUTING AND RE-EXECUTING A LIST OF COMPONENT HANDLERS DEFINED FOR A RESOURCE IN RESPONSE TO DETECTING A CREATION, DELETION, OR MODIFICATION OF THE RESOURCE

(71) Applicant: SAP SE, Walldorf (DE)

(72) Inventors: Jannick Stephan Fahlbusch, Berlin (DE); Bryon Hummel, Kitchener (CA)

(73) Assignee: SAP SE, Walldorf (DE)

( * ) Notice: Subject to any disclaimer, the term of this patent is extended or adjusted under 35 U.S.C. 154(b) by 266 days.

(21) Appl. No.: 16/879,478

(22) Filed: May 20, 2020

(65) Prior Publication Data
US 2021/0365293 A1 Nov. 25, 2021

(51) Int. Cl.
| | | |
|---|---|---|
| G06F 9/50 | (2006.01) | |
| G06F 9/54 | (2006.01) | |
| G06F 11/30 | (2006.01) | |
| G06F 21/62 | (2013.01) | |
| H04L 67/1097 | (2022.01) | |
| G06F 21/46 | (2013.01) | |
| H04L 67/01 | (2022.01) | |

(52) U.S. Cl.
CPC ............ *G06F 9/5016* (2013.01); *G06F 9/546* (2013.01); *G06F 11/3006* (2013.01); *G06F 21/46* (2013.01); *G06F 21/6218* (2013.01); *H04L 67/01* (2022.05); *H04L 67/1097* (2013.01)

(58) Field of Classification Search
CPC .... G06F 9/5016; G06F 9/546; G06F 11/3006; G06F 21/46; G06F 21/6218; G06F 11/3058; G06F 11/301; G06F 2201/80; G06F 11/302; G06F 2221/2111; G06F 21/45; H04L 67/1097; H04L 67/42; H04L 67/12
See application file for complete search history.

(56) References Cited

U.S. PATENT DOCUMENTS

| | | | | |
|---|---|---|---|---|
| 5,634,072 A | * | 5/1997 | Allen | .................. G06F 12/0804 711/E12.04 |
| 6,092,084 A | * | 7/2000 | Clark | .................. G06F 11/2097 |
| 6,101,194 A | * | 8/2000 | Annapareddy | ......... H04L 29/06 370/450 |

(Continued)

*Primary Examiner* — Jorge A Chu Joy-Davila
(74) *Attorney, Agent, or Firm* — Schwegman Lundberg & Woessner, P.A.

(57) ABSTRACT

A specialized in-memory database health check process is utilized to resolve dependencies in a resource indicating requirements for an instance of an in-memory database. Specifically, when an instance of an in-memory database is created in response to a request, a list of one or more component handlers are obtained. These component handlers are modular functions, separate from each other but potentially dependent on one or more other component handlers, and act to validate various requirements listed in a resource for the request. Each of the component handlers are executed individually during execution of a Reconcile function. To the extent that the execution of any component handlers in the list is unsuccessful, the Reconcile function is rerun for another iteration. These iterations continue until all component handlers report back as successful. Instance creation is then considered successful and the instance of the in-memory database can be utilized by users.

20 Claims, 7 Drawing Sheets

(56) References Cited

U.S. PATENT DOCUMENTS

| | | | | |
|---|---|---|---|---|
| 8,973,113 B1* | 3/2015 | Eatough | ............... | H04L 63/08 |
| | | | | 726/6 |
| 2009/0319932 A1* | 12/2009 | Robinson | ............ | G06F 16/2308 |
| | | | | 707/999.1 |
| 2010/0100885 A1* | 4/2010 | Groff | .................. | G06F 9/466 |
| | | | | 718/104 |
| 2014/0123099 A1* | 5/2014 | Amulu | .................. | G06F 8/34 |
| | | | | 717/100 |
| 2015/0012488 A1* | 1/2015 | Van Rossum | ....... | G06F 16/1767 |
| | | | | 707/611 |
| 2019/0306010 A1* | 10/2019 | Medam | ............. | G06F 11/2094 |
| 2019/0324786 A1* | 10/2019 | Ranjan | ............... | G06F 9/45558 |
| 2021/0019195 A1* | 1/2021 | Aronov | ............... | G06F 9/5077 |

\* cited by examiner

EXECUTING AND RE-EXECUTING A LIST OF COMPONENT HANDLERS DEFINED FOR A RESOURCE IN RESPONSE TO DETECTING A CREATION, DELETION, OR MODIFICATION OF THE RESOURCE

TECHNICAL FIELD

This document generally relates to in-memory database technology. More specifically, this document relates to a service trace mining of an in-memory database.

BACKGROUND

An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. One example in-memory database is the HANA® database from SAP SE, of Walldorf, Germany.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
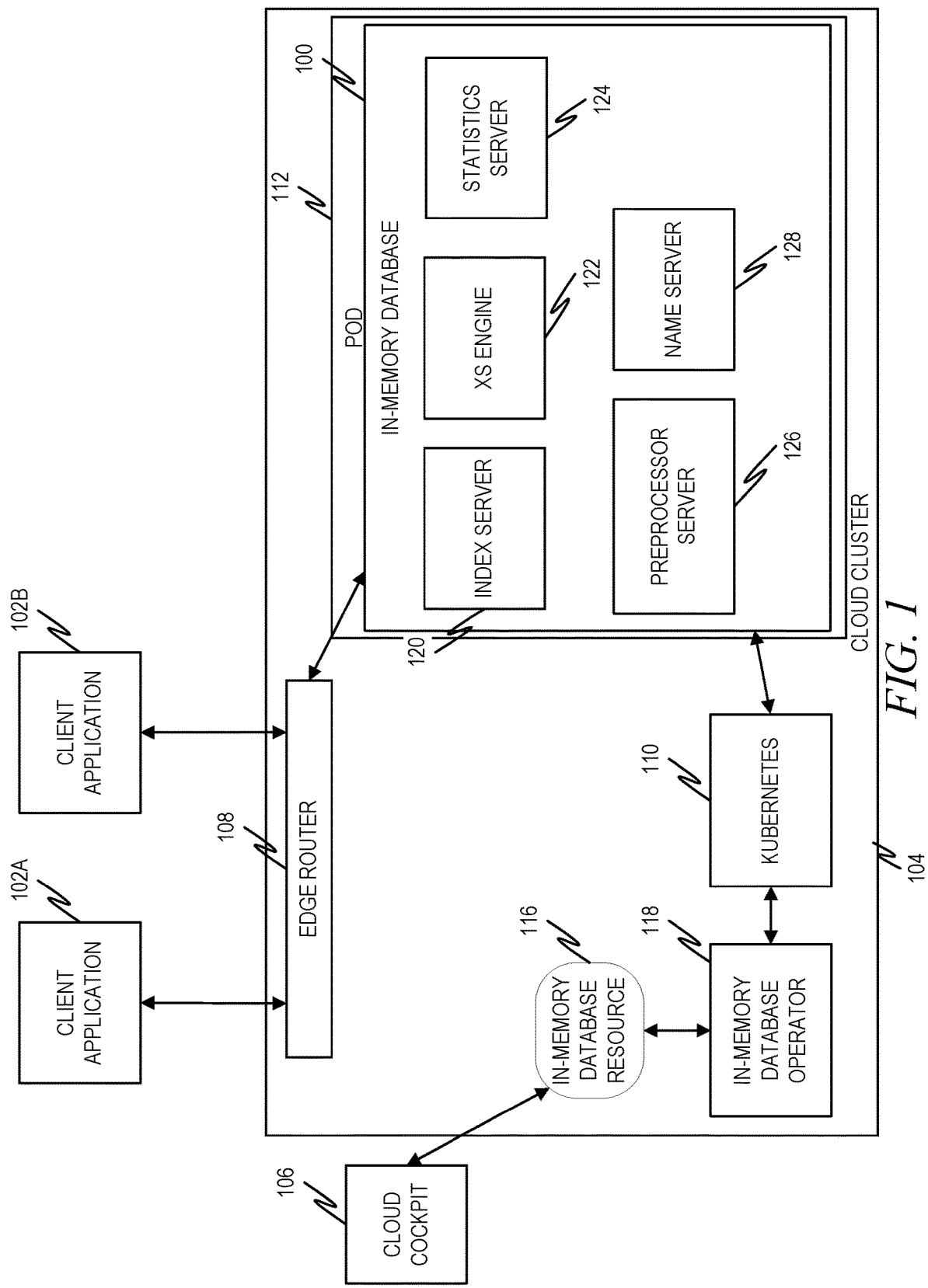
FIG. 1 is a diagram illustrating a cloud-based in-memory database management system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

One implementation of in-memory databases is to place them in a cloud and allow access to the cloud database as a service. This allows customers to leverage the in-memory data processing and advanced analytic capabilities in the cloud.

Such services may allow applications to be developed using specialized in-memory database extended application services and deployed to a Cloud Foundry environment. Cloud Foundry is an open source, multi-cloud application platform as a service that allows for continuous delivery as it supports a full application development lifecycle, from initial deployment through testing stages to deployment. Cloud Foundry utilizes a container-based architecture that runs an application in any programming language over a variety of cloud service providers.

A customer-facing application is provided as part of an in-memory database in a cloud environment. This customer-facing application allows a customer to request lifecycle actions on the in-memory database, such as database creation, deletion, schema updates, and so forth. An example of such a customer-facing application is Cloud Cockpit. Cloud Cockpit communicates its lifecycle requests to a service broker, which is a component located in an in-memory database cloud cluster. The service broker then interprets the requests and initiates the underlying database operation.

The customer-facing application provides a document known as a resource that describes how the instance of the in-memory database should be utilized. This may include specifying, for example, a size, which features should be enabled, what security parameters should be utilized (e.g., password), and so forth. The in-memory database operator then brings the instance into the state described in this resource.

One technical problem encountered, however, is in ensuring that the instance of the in-memory database meets all the requirements specified in the resource. This may be known as an in-memory database instance health check. More particularly, sometimes the requirements have dependencies on one another, in that it is not even possible to determine whether one requirement has been satisfied until another requirement has been satisfied first. There currently is no mechanism to successfully run an in-memory database instance health check in a container-based architecture when there are dependencies in the resource for the instance.

In an example embodiment, a specialized in-memory database health check process is utilized to resolve dependencies in a resource indicating requirements for an instance of an in-memory database. Specifically, when an instance of an in-memory database is created in response to a request, a list of one or more component handlers are obtained. These component handlers are modular functions, separate from each other but potentially dependent on one or more other component handlers, and act to validate various requirements listed in a resource for the request. Each of the component handlers are executed individually during execution of a Reconcile function. To the extent that the execution of any component handlers in the list is unsuccessful, the Reconcile function is rerun for another iteration. These iterations continue until all component handlers report back as successful. Instance creation is then considered successful and the instance of the in-memory database can be utilized by users.

FIG. 1 is a diagram illustrating a cloud-based in-memory database management system 100, including its client/external connection points, which can be kept stable in the case of disaster recovery to ensure stable service operations, in accordance with an example embodiment. Here, the in-memory database management system 100 may be coupled to one or more client applications 102A, 102B. The client applications 102A, 102B may communicate with the in-memory database management system 100 through a number of different protocols, including Structured Query Language (SQL), Multidimensional Expressions (MDX), Hypertext Transfer Protocol (HTTP), REST, and Hypertext Markup Language (HTML).

The in-memory database 100 may be stored in cloud cluster 104. Also depicted is a cloud cockpit 106, used to perform lifecycle operations on the in-memory database 100. The one or more client applications 102A, 102B may access the in-memory database system via an edge router 108. On the back end, however, Kubernetes 110 is used to manage the specific instance of the in-memory database, which may be stored in a Kubernetes pod 112 or other container.

An in-memory database operator 118 may receive a request from the cloud cockpit 106 to create an instance of the in-memory database 100. This request may include, or at least reference, an in-memory database resource 118 which specifies one or more requirements of the in-memory database 100. The in-memory database operator 118 may then interface with Kubernetes 110 to create the in-memory database 100 in the pod 112. More particularly, the in-memory database resource may be established by a service broker application program interface (API).

The in-memory database 100 may comprise a number of different components, including an index server 120, an XS engine 122, a statistics server 124, a preprocessor server 126, and a name server 128. These components may operate on a single computing device or may be spread among multiple computing devices (e.g., separate servers).

The index server 120 contains the actual data and the engines for processing the data. It also coordinates and uses all the other servers.

The XS engine 122 allows clients to connect to the in-memory database 100 using web protocols.

The statistics server 124 collects information about status, performance, and resource consumption from all the other server components. The statistics server 124 can be accessed from the cloud cockpit 106 to obtain the status of various alert monitors.

The preprocessor server 126 is used for analyzing text data and extracting the information on which text search capabilities are based.

The name server 128 holds information about the database topology. This is used in a distributed system with instances of the database on different hosts. The name server 128 knows where the components are running and which data is located on which server.

Figure 2:
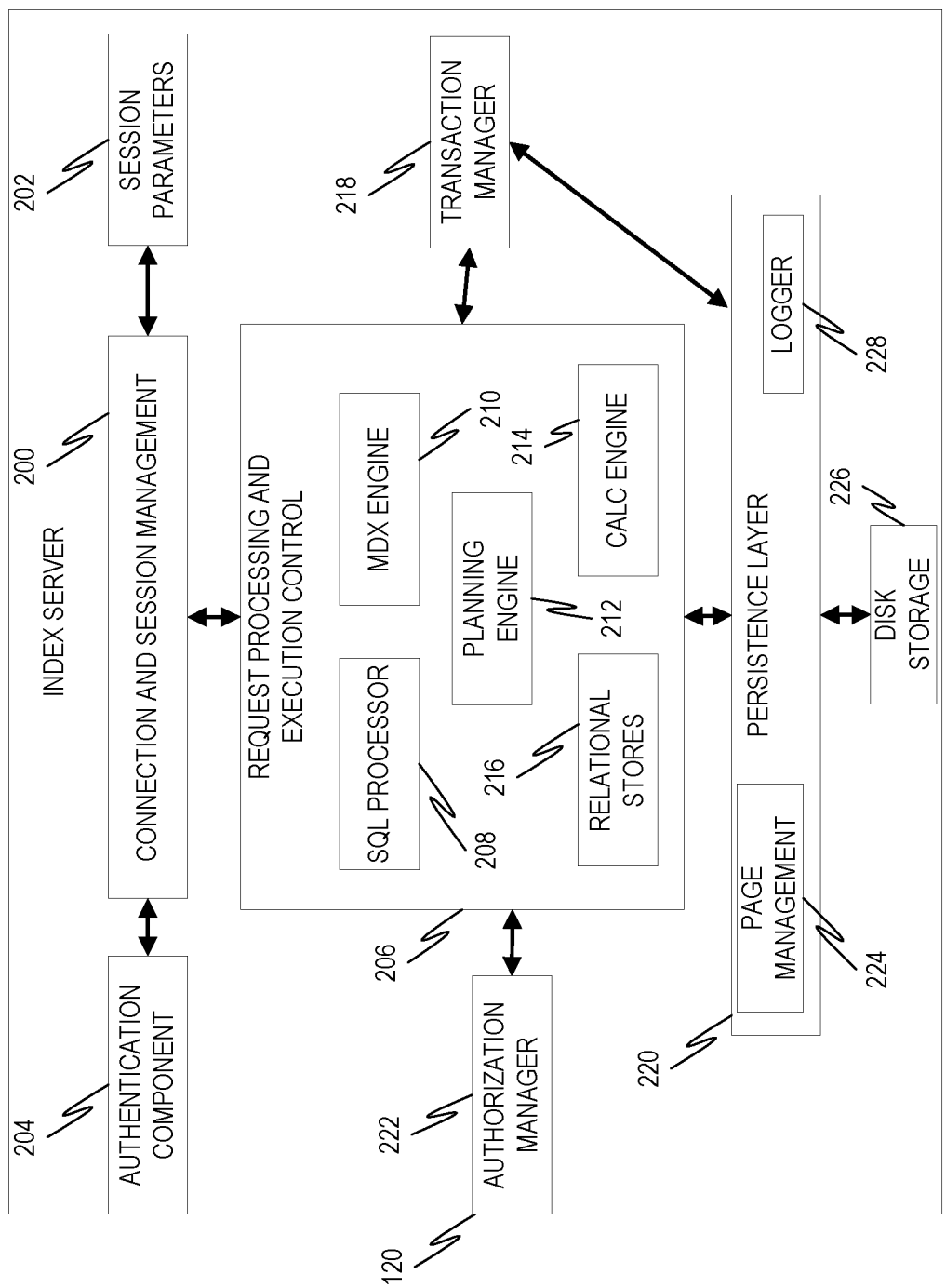
FIG. 2 is a diagram illustrating an index server, in accordance with an example embodiment.

FIG. 2 is a diagram illustrating an index server 120, in accordance with an example embodiment. Specifically, the index server 120 of FIG. 1 is depicted in more detail. The index server 120 includes a connection and session management component 200, which is responsible for creating and managing sessions and connections for the database clients. Once a session is established, clients can communicate with the database system using SQL statements. For each session, a set of session parameters 202 may be maintained, such as auto-commit, current transaction isolation level, and so forth. Users (e.g., system administrators, developers) may be authenticated by the database system itself (e.g., by logging in with user name and password, using an authentication component 204), or authentication can be delegated to an external authentication provider such as a Lightweight Directory Access Protocol (LDAP) directory.

The client requests can be analyzed and executed by a set of components summarized as request processing and execution control 206. An SQL processor 208 checks the syntax and semantics of the client SQL statements and generates a logical execution plan. MDX are a language for querying and manipulating multidimensional data stored in online analytical processing (OLAP) cubes. As such, an MDX engine 210 is provided to allow for the parsing and executing of MDX commands. A planning engine 212 allows applications (e.g., financial planning applications) to execute basic planning operations in the database layer. One such operation is to create a new version of a dataset as a copy of an existing dataset, while applying filters and transformations.

A calc engine 214 implements the various SQL script and planning operations. The calc engine 214 creates a logical execution plan for calculation models derived from SQL scripts, MDX, planning, and domain-specific models. This logical execution plan may include, for example, breaking up a model into operations that can be processed in parallel.

The data is stored in relational stores 216, which implement a relational database in main memory.

Each SQL statement may be processed in the context of a transaction. New sessions are implicitly assigned to a new transaction. A transaction manager 218 coordinates database transactions, controls transactional isolation, and keeps track of running and closed transactions. When a transaction is committed or rolled back, the transaction manager 218 informs the involved engines about this event so they can execute needed actions. The transaction manager 218 also cooperates with a persistence layer 220 to achieve atomic and durable transactions.

An authorization manager 222 is invoked by other database system components to check whether the user has the specified privileges to execute the requested operations. The database system allows for the granting of privileges to users or roles. A privilege grants the right to perform a specified operation on a specified object.

The persistence layer 220 ensures that the database is restored to the most recent committed state after a restart and that transactions are either completely executed or completely undone. To achieve this goal in an efficient way, the persistence layer 220 uses a combination of write-ahead logs, shadow paging, and save points. The persistence layer 220 also offers a page management interface 224 for writing and reading data to and from a separate disk storage 226, and also contains a logger 228 that manages the transaction log. Log entries can be written implicitly by the persistence layer 220 when data is written via the persistence interface or explicitly by using a log interface.

Figure 3:
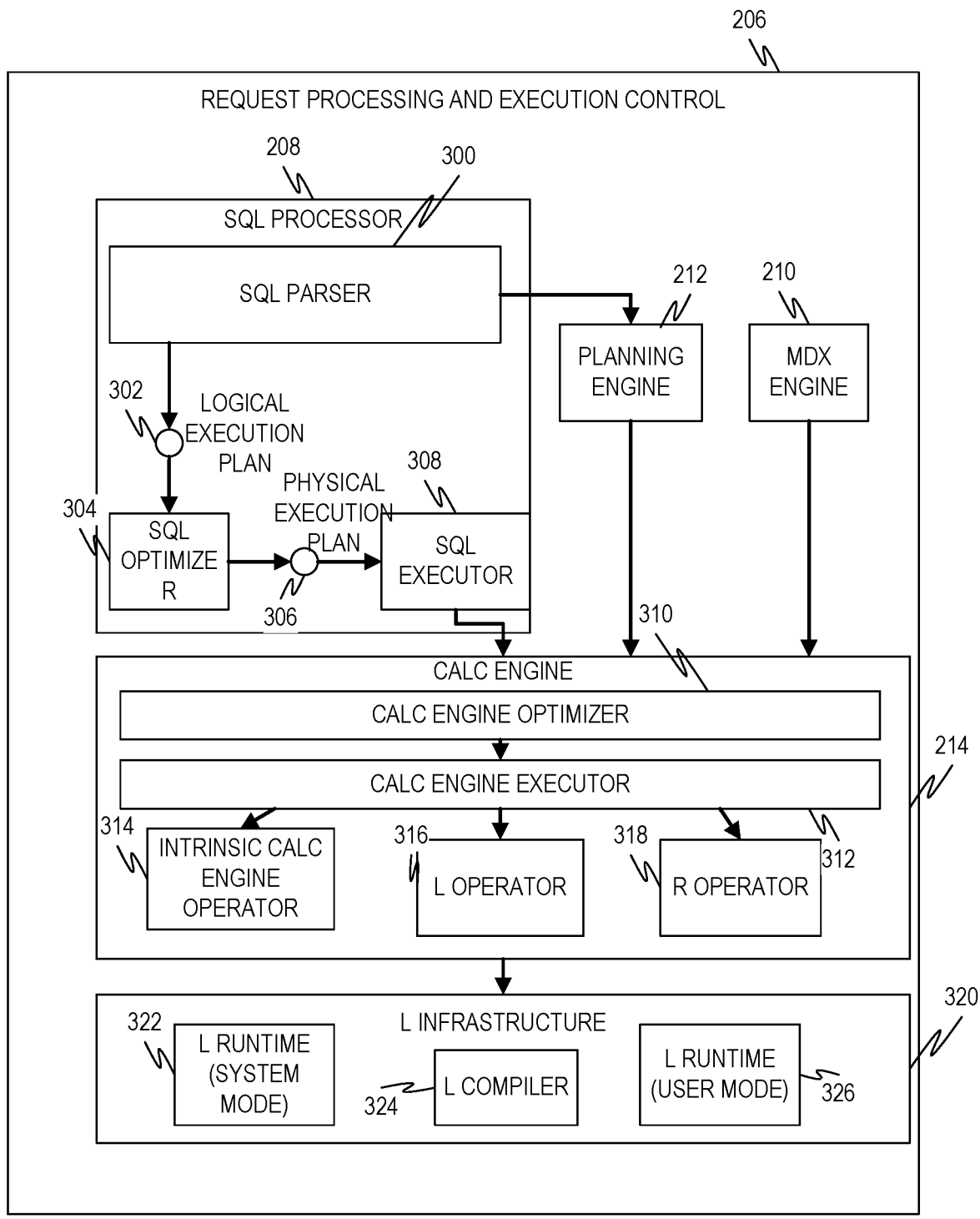
FIG. 3 is a diagram illustrating a request processing and execution control, in accordance with an example embodiment.

FIG. 3 is a diagram illustrating a request processing and execution control 206, in accordance with an example embodiment. This diagram depicts the request processing and execution control 206 of FIG. 2 in more detail. The SQL processor 208 contains an SQL parser 300, which parses an SQL statement and generates a logical execution plan 302, which it passes to an SQL optimizer 304. The SQL optimizer 304 then optimizes the logical execution plan 302 and converts it to a physical execution plan 306, which it then passes to an SQL executor 308. The calc engine 214 implements the various SQL script and planning operations, and includes a calc engine optimizer 310, which optimizes the operations, a calc engine executor 312, which executes the operations, and an intrinsic calc engine operator 314, an L operator 316, and an R operator 318.

An L infrastructure 320 includes a number of components to aid in the running of L procedures, including an L-runtime (system mode) 322, an L compiler 324, and an L-runtime (user mode) 326.

As described earlier, the in-memory database operator 112 acts to create the instance of the in-memory database in a Kubernetes pod. As part of this creation process, the requirements specified in the in-memory database resource 114 must be met. In order to verify that these requirements are met, even in situations where the requirements may be dependent upon other requirements being met, a series of component handlers may be executed.

Each component handler is a separate function that is modular in nature, in that a component handler can be swapped out with another component handler. While these component handlers may be separate, the requirements that they are validating may be dependent on requirements from other component handlers. In order to address this, in an example embodiment, an iterative process is used to execute the component handlers.

More particularly, a main function in the in-memory database operator 118 watches the Cloud Cluster 104. If it detects that a resource gets created, deleted, or modified, it calls a reconcile function. The reconcile function then detects a state of the instance of the in-memory database (if available) and tries to create (or modify) an instance of the in-memory database so that the instance meets the requirements in the in-memory database resource 116. Then each defined component handler is executed. It should be noted that each component handler has one or more conditions upon which it is supposed to act (or not act). Thus, it is possible that not all component handlers will actually fire when executed, if their conditions indicate that they should not. For purposes of these documents, this will still be considered to be a component handler "executing," even if that execution stops at the determination that the conditions for firing have not been met. It should be noted that in an example embodiment, the check of the conditions is executed by each component handler individually, thus decoupling them. Once a component handler fires and completes execution, it can report back that it is successful and it will not need to run again in a subsequent iteration. All the component handlers are executed in the first iteration, and any component handlers that do not report back as successful are then executed in the second iteration. This process repeats until all component handlers are successful.

Figure 4:
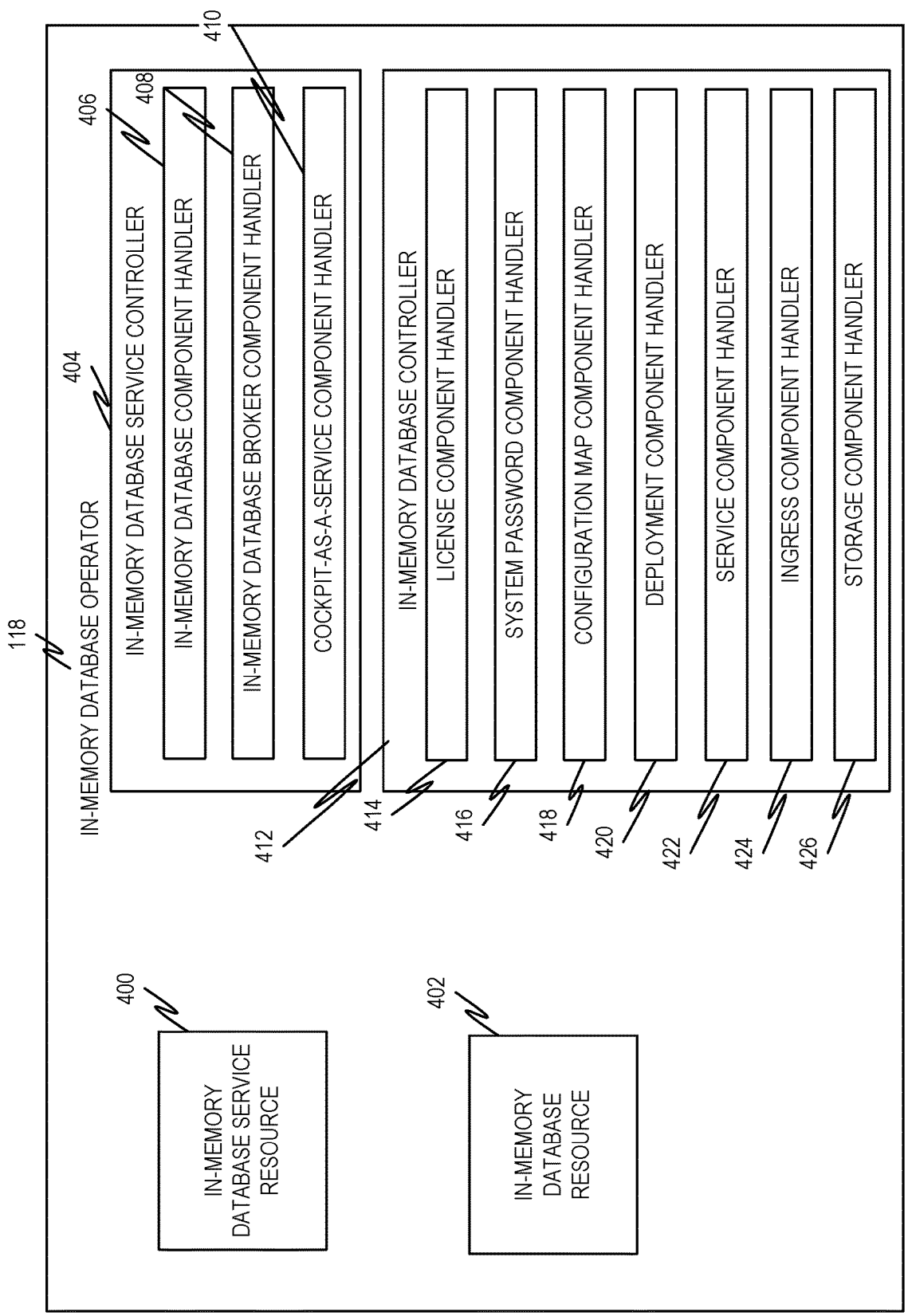
FIG. 4 is a block diagram illustrating an in-memory database operator 118, in accordance with an example embodiment.

The in-memory database operator 118 comprises multiple controllers of the same family. In this case, the family is controllers related to an in-memory database 100. FIG. 4 is a block diagram illustrating an in-memory database operator 118, in accordance with an example embodiment. Here, the in-memory database operator 118 comprises two resources: an in-memory database service resource 400 and an in-memory database resource 402. The in-memory database service resource 400 is a high-level abstracted resource containing only parameters that a customer sends to a landscape. Status messages on the resource are designed to be sent back to the customer to indicate the progress of operations on the instance of the in-memory database 100 or to communicate failures back. The status on this resource can be defined as a return-channel to the customer.

The in-memory database resource 402 is a low-level resource designed to represent the actual configuration, size, and location of the in-memory database instance 100 within the cloud cluster 104 (which is part of the landscape mentioned in the description of the in-memory database service resource 400)

Workflow within a controller in the in-memory database operator 118 follows a "reconcile" pattern. The pattern makes no assumptions about the environment surrounding the application but looks at the state of the world while working on one resource. This means that the whole application is stateless and computes its state when there is work (reconciliation) to do.

Thus, the controller does not need to recognize the difference between a creation, a modification, a periodic check, or a deletion. Indeed, the in-memory database operator 118 does not need to know whether the resource just got created, modified, or if the current call is just a periodic check for the health of the system. The whole process operating on a given resource is simply called a reconciliation.

In order to simplify some of the internal workings of the in-memory database operator 118, in an example embodiment, smaller controllers that perform only a single dedicated task are implemented. These single-task controllers are called "component handlers."

All component handlers are resilient against several failures that could occur during runtime, such as network outages, program crashes, permission issues, and other errors. This is accomplished by retrying the operation of the component handler again until it succeeds. If an operation is not finished, unable to be performed, or returns an error, the entire reconcile function requeues the request for another reconciliation of the resource. The in-memory database operator 118 implements exponential back-offs so that the reconcilers will wait exponentially longer after each failure to increase the chances of being successful without stressing the system.

An in-memory database service controller 404 watches all in-memory database resources 402 in a given cluster. When it detects a change, such as a creation, modification, or deletion, it triggers a new reconciliation run. Because a reconciliation run is stateless, it must first get the affected instance by querying an API for Kubernetes 110 for the resource. Afterwards, every min-reconciler is instantiated and sequentially called (in no particular order, as the pattern of not making assumptions about the surrounding environment applies here as well). In an example embodiment, the in-memory database service controller 404 contains the following component handlers: in-memory database component handler 406, in-memory database broker component handler 408, and cockpit-as-a-service component handler 410.

The in-memory database component handler 406 creates an instance of the in-memory database 110 by transforming the customer's request to more detailed, low-level directives that are then picked up by an in-memory database controller 412. When called, the in-memory database component handler 406 tries to find a matching in-memory database source (by trying to obtain it using the same name as the in-memory database service resource 400). If the component handler is unable to retrieve the desired resource, it creates the in-memory database resource 402. If the in-memory database resource 402 is available but not in the desired state, it places the in-memory database resource 402 in the desired state.

The in-memory database broker component handler 406 registers the in-memory database 110 instance to a broker within the cloud cluster 104 so that a customer can create applications based on the in-memory database 110 instance. As a prerequisite, the underlying in-memory database resource 116 needs to indicate that it is ready.

The cockpit-as-a-service component handler 410 registers the in-memory database 110 instance to a cockpit-as-a-service program. As a prerequisite, the underlying in-memory database resource 116 needs to indicate that it is ready.

In an example embodiment, the in-memory database controller 412 contains the following component handlers: a license component handler 414, a system password component handler 416, a configuration map component handler 418, a deployment component handler 420, a service component handler 422, an ingress component handler 424, and a storage component handler 426.

The license component handler 414 configures the license of the in-memory database 110 instance so that it can be continued to be used by the customer. As a prerequisite, the underlying in-memory database resource 116 needs to indicate that its system database is available and accepts connections.

The system password component handler 416 changes the system password of the tenant database of the customer to the password specified by the customer. As a prerequisite, the in-memory database resource 116 needs to indicate that it is ready.

The configuration map component handler 418 creates a Kubernetes configuration map, which contains the configuration of the in-memory database 100 instance. When called by the reconciler, this component handler tries to find a matching configuration map resource (using the same name as the in-memory database resource 116). If the reconciler is unable to retrieve the desired resource, it creates the configuration map.

The deployment component handler 420 creates a Kubernetes deployment, which results in a pod 112 that will eventually hold the running in-memory database 100 instance. When called, the reconciler tries to find a matching deployment resource (using the same name as the in-memory database resource 116). If the reconciler is unable to retrieve the desired resource, it creates the deployment.

The service component handler 422 creates a cluster-internal service so that the in-memory database instance 100 is reachable within the cloud cluster 104. When called, the reconciler tries to find a matching service resource (using the same name as the in-memory database resource 116). If the reconciler is unable to retrieve the desired resource, it creates the service.

The ingress component handler 424 creates a Kubernetes ingress with a given fully qualified domain name for external access from the customer. When called, the reconciler tries to find a matching service resource (using the same name as the in-memory database resource 116). If the reconciler is unable to retrieve the desired resource, it creates the ingress. Additionally, specified Internet Protocol (IP) ranges from the customer are passed to the ingress object. With this, the customer can whitelist traffic. The reconciler adds internal IP ranges that the service needs to communicate with the cloud platform.

The storage component handler 426 creates a storage in the form of a volume that holds the data of the in-memory database instance, in encrypted format. When called, the reconciler tries to find a matching volume resource (using the same name as the in-memory database resource 116). If the reconciler is unable to retrieve the desired resource, it creates the volume.

Figure 5:
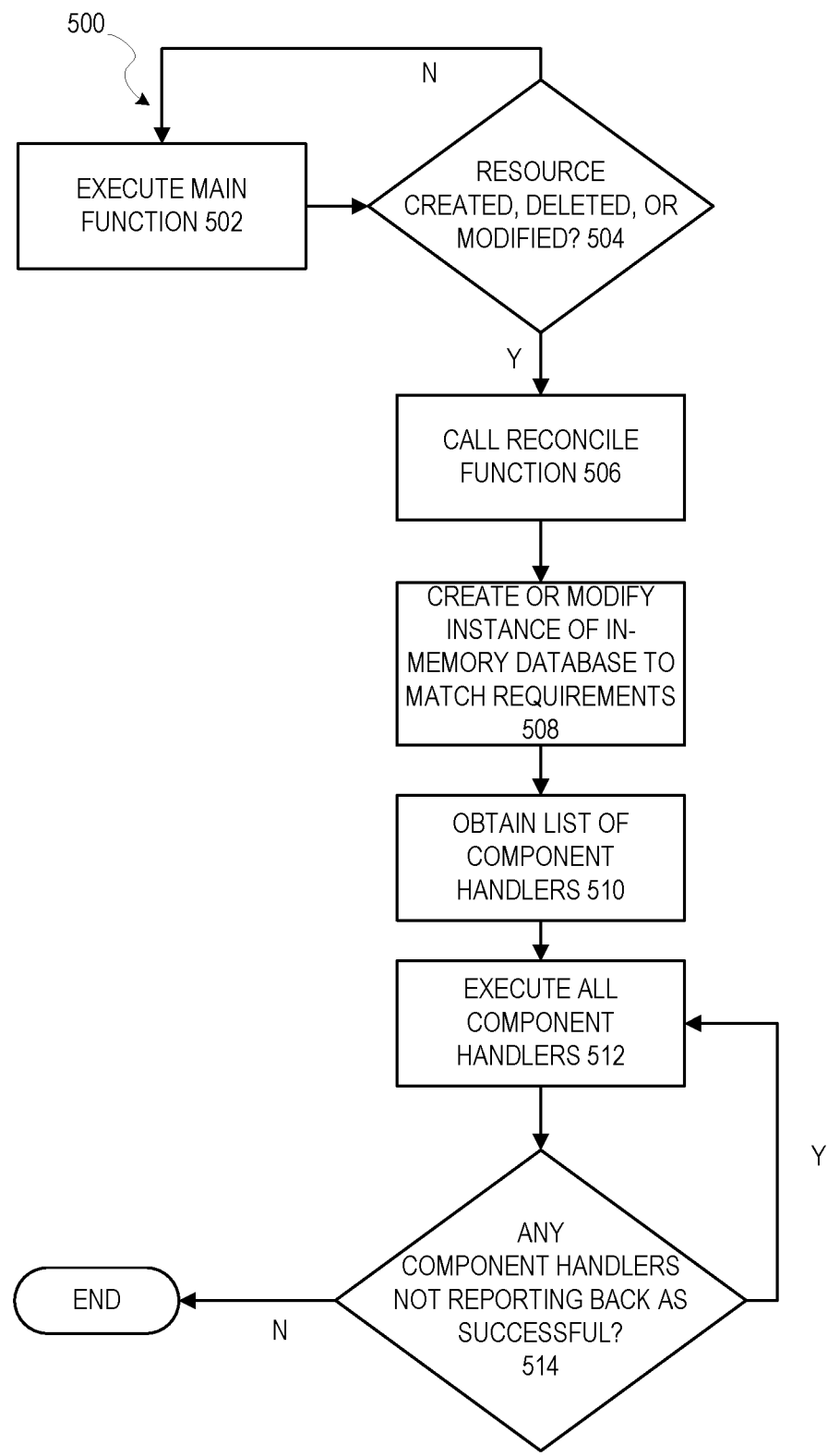
FIG. 5 is a flow diagram illustrating a method 500 for operating an in-memory database operator within a container orchestrator, in accordance with an example embodiment.

FIG. 5 is a flow diagram illustrating a method 500 for operating an in-memory database operator within a container orchestrator, in accordance with an example embodiment. At operation 502, a main function in the in-memory database operator is executed. The main function watches a cloud cluster for a creation, deletion, or modification of a resource. At operation 504, it is determined if a resource is created, deleted, or modified. If not, then the method 500 repeats to operation 502. If so, then a reconcile function is called at operation 506. The reconcile function then performs the remaining operations in the method 500. At operation 508, an instance of an in-memory database is created or modified to match the requirements of the resource. At operation 510, a list of a plurality of component handlers defined for the resource is obtained. At operation 512, all of the component handlers in the list are executed. A loop is then begun for all component handlers that dos not report back as successful after a period of time. At operation 516, it is determined whether there are any component handlers that have not reported back as successful. If so, the reconcile function is re-executed and the method 500 loops back to operation 512. Once all component handlers have reported back as successful, the method 500 ends.

EXAMPLES

Example 1. A system comprising:
  at least one hardware processor; and
  a computer-readable medium storing instructions that, when executed by the at least one hardware processor, cause the at least one hardware processor to perform operations for operating an in-memory database operator within a container orchestrator, comprising:
    running a main function in the in-memory database operator, the main function watching a cloud cluster for a creation, deletion, or modification of a resource, the resource containing a list of one or more requirements;
    in response to the main function detecting a creation, deletion, or modification of the resource, calling a reconcile function, the reconcile function performing the operations of:
      creating or modifying an instance of an in-memory database to match the requirements of the resource;
      obtaining a list of a plurality of component handlers defined for the resource;
      executing all of the component handlers in the list; and
      in response to a determination that any component handler does not report back as successful after a period of time, re-executing all of the component handlers in the list, until all component handlers in the list report back as successful.

Example 2. The system of Example 1, wherein the period of time is a different period of time each time the re-executing operation is performed on the same component handler.

Example 3. The system of Example 2, wherein the period of time grows exponentially each time the re-executing operation is performed on the same component handler.

Example 4. The system of any of Examples 1-3, wherein at least one of the component handlers cannot be executed until the resource indicates it is ready.

Example 5. The system of any of Examples 1-4, wherein the container orchestrator is Kubernetes.

Example 6. The system of any of Examples 1-5, wherein the list of component handlers includes at least one component handler corresponding to an in-memory database resource and at least one component handler corresponding to an in-memory database service resource.

Example 7. The system of any of Examples 1-6, wherein the at least one component handler corresponding to the in-memory database resource includes a system password component handler, which changes a system password of a tenant database of a customer.

Example 8. A method comprising:
  running a main function in the in-memory database operator, the main function watching a cloud cluster for a creation, deletion, or modification of a resource, the resource containing a list of one or more requirements;
  in response to the main function detecting a creation, deletion, or modification of the resource, calling a reconcile function, the reconcile function performing the operations of:
    creating or modifying an instance of an in-memory database to match the requirements of the resource;
    obtaining a list of a plurality of component handlers defined for the resource;
    executing all of the component handlers in the list; and
    in response to a determination that any component handler does not report back as successful after a period of time, re-executing all of the component handlers in the list, until all component handlers in the list report back as successful.

Example 9. The method of Example 8, wherein the period of time is a different period of time each time the re-executing operation is performed on the same component handler.

Example 10. The method of Example 9, wherein the period of time grows exponentially each time the re-executing operation is performed on the same component handler.

Example 11. The method of any of Examples 8-10, wherein at least one of the component handlers cannot be executed until the resource indicates it is ready.

Example 12. The method of any of Examples 8-11, wherein the container orchestrator is Kubernetes.

Example 13. The method of any of Examples 8-12, wherein the list of component handlers includes at least one component handler corresponding to an in-memory database resource and at least one component handler corresponding to an in-memory database service resource.

Example 14. The method of any of Examples 8-13, wherein the at least one component handler corresponding to the in-memory database resource includes a system password component handler, which changes a system password of a tenant database of a customer.

Example 15. A non-transitory machine-readable medium storing instructions which, when executed by one or more processors, cause the one or more processors to perform operations comprising:
  running a main function in the in-memory database operator, the main function watching a cloud cluster for a creation, deletion, or modification of a resource, the resource containing list of one or more requirements;
  in response to the main function detecting a creation, deletion, or modification of the resource, calling a reconcile function, the reconcile function performing the operations of:
    creating or modifying an instance of an in-memory database to match the requirements of the resource;
    obtaining a list of a plurality of component handlers defined for the resource;
    executing all of the component handlers in the list; and
    in response to a determination that any component handler does not report back as successful after a period of time, re-executing all of the component handlers in the list, until all component handlers in the list report back as successful.

Example 16. The non-transitory machine-readable medium of Example 15, wherein the period of time is a different period of time each time the re-executing operation is performed on the same component handler.

Example 17. The non-transitory machine-readable medium of Example 16, wherein the period of time grows exponentially each time the re-executing operation is performed on the same component handler.

Example 18. The non-transitory machine-readable medium of any of Examples 15-17, wherein at least one of the component handlers cannot be executed until the resource indicates it is ready.

Example 19. The non-transitory machine-readable medium of any of Examples 15-18, wherein the container orchestrator is Kubernetes.

Example 20. The non-transitory machine-readable medium of any of Examples 15-19, wherein the list of component handlers includes at least one component handler corresponding to an in-memory database resource and at least one component handler corresponding to an in-memory database service resource.

Figure 6:
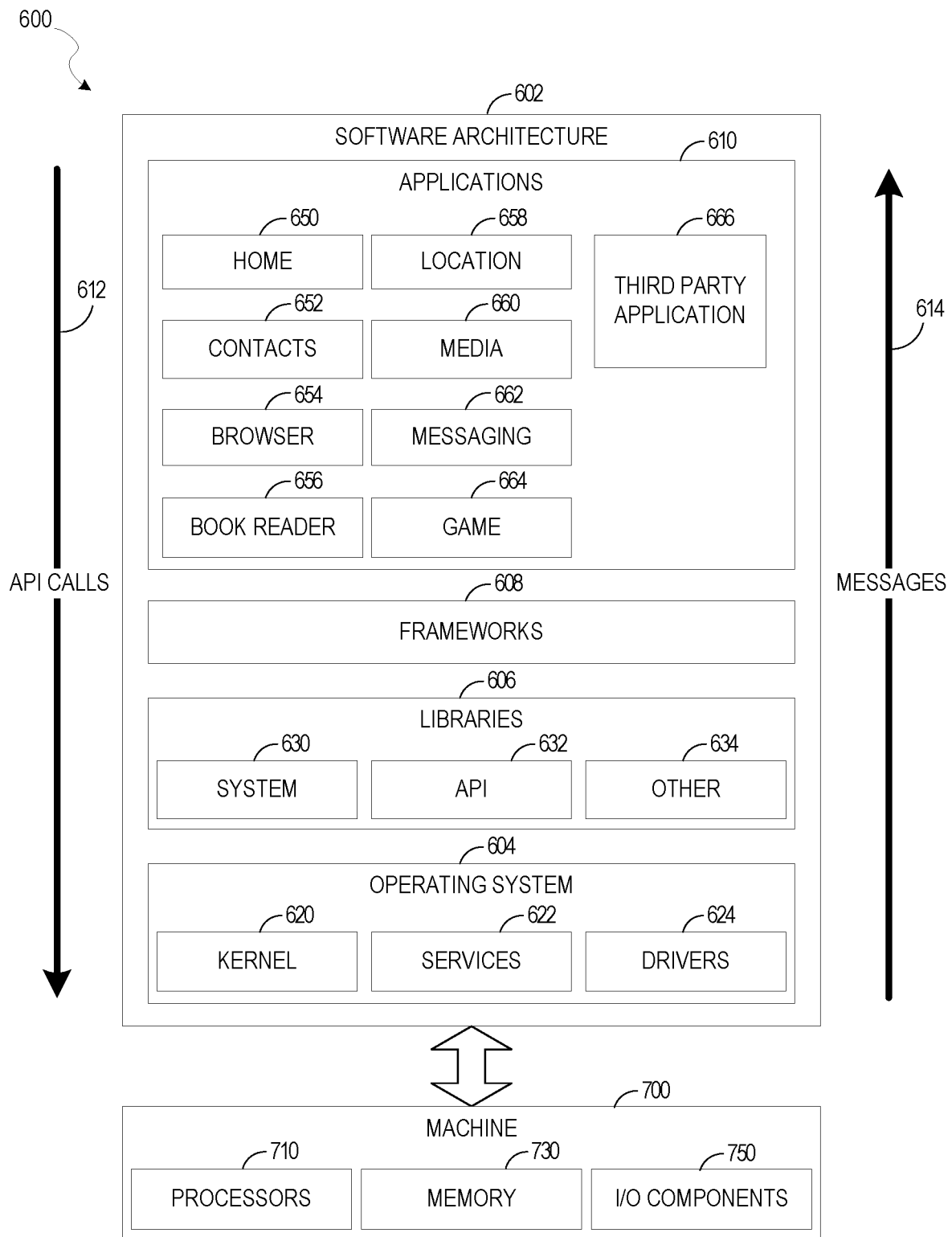
FIG. 6 is a block diagram illustrating an architecture of software, which can be installed on any one or more of the devices described above.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
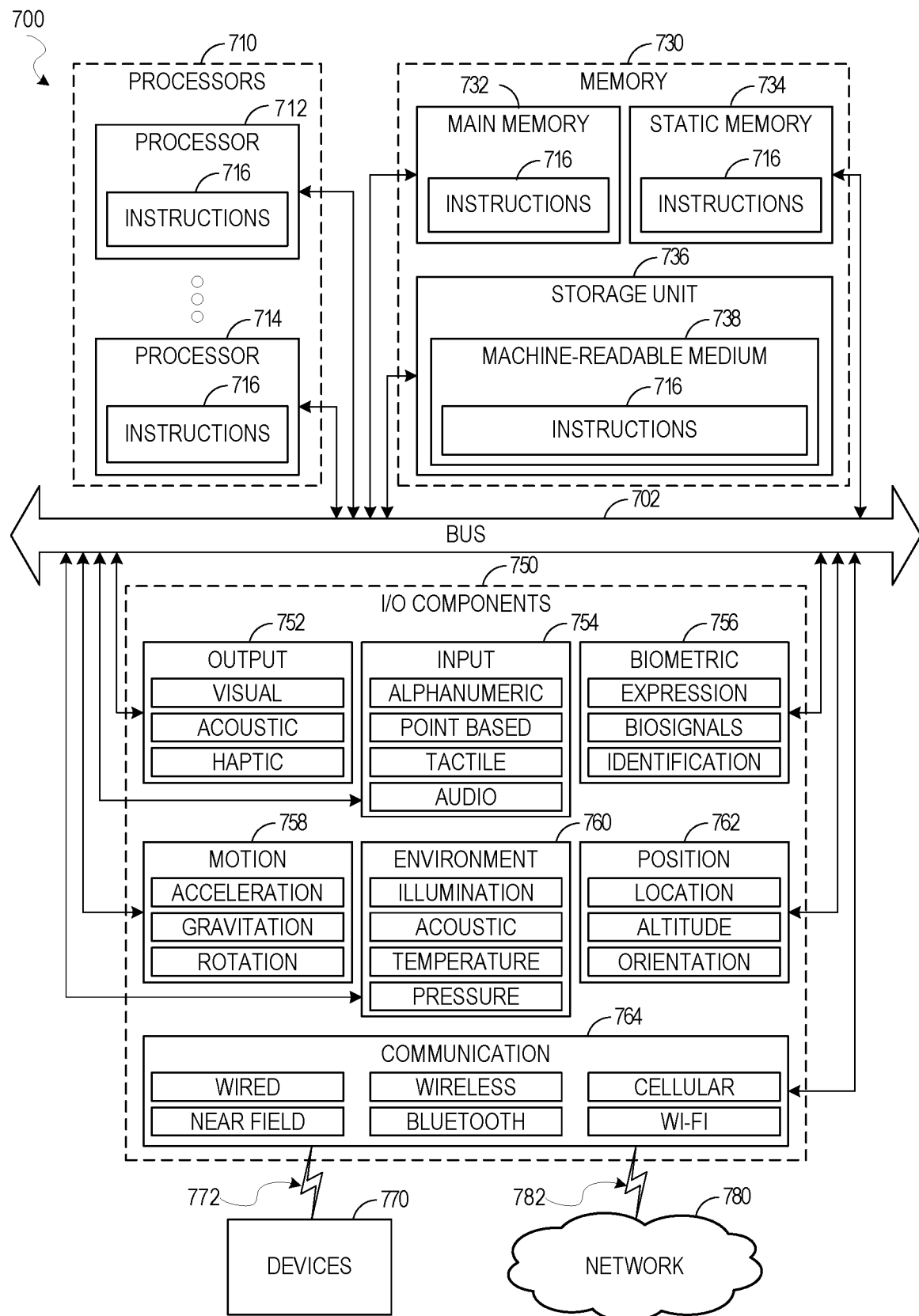
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the methods of FIG. 5. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via IP geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations for operating an in-memory database operator within a container orchestrator, the operations comprising:
   running a main function in the in-memory database operator, the main function watching a cloud cluster for a creation, deletion, or modification of a resource, the resource containing a list of one or more requirements; and
   in response to the main function detecting a creation, deletion, or modification of the resource, calling a reconcile function, the reconcile function performing the operations of:
      creating or modifying an instance of an in-memory database to match the requirements of the resource;
      obtaining a list of a plurality of component handlers defined for the resource;
      executing all of the component handlers in the list; and
      in response to a determination that any component handler does not report back as successful after a period of time, re-executing all of the component handlers in the list, until all component handlers in the list report back as successful.

2. The system of claim 1, wherein the period of time is a different period of time each time the re-executing operation is performed on a same component handler.

3. The system of claim 2, wherein the period of time grows exponentially each time the re-executing operation is performed on the same component handler.

4. The system of claim 1, wherein at least one of the component handlers cannot be executed until the resource indicates it is ready.

5. The system of claim 1, wherein the container orchestrator is Kubernetes.

6. The system of claim 1, wherein the list of component handlers includes at least one component handler corresponding to an in-memory database resource and at least one component handler corresponding to an in-memory database service resource.

7. The system of claim 1, wherein the at least one component handler corresponding to the in-memory database resource includes a system password component handler, which changes a system password of a tenant database of a customer.

8. A method comprising:
   running a main function in a in-memory database operator within a container orchestrator, the main function watching a cloud cluster for a creation, deletion, or modification of a resource, the resource containing a list of one or more requirements; and
   in response to the main function detecting a creation, deletion, or modification of the resource, calling a reconcile function, the reconcile function performing the operations of:
      creating or modifying an instance of an in-memory database to match the requirements of the resource;
      obtaining a list of a plurality of component handlers defined for the resource;
      executing all of the component handlers in the list; and
      in response to a determination that any component handler does not report back as successful after a period of time, re-executing all of the component handlers in the list, until all component handlers in the list report back as successful.

9. The method of claim 8, wherein the period of time is a different period of time each time the re-executing operation is performed on a same component handler.

10. The method of claim 9, wherein the period of time grows exponentially each time the re-executing operation is performed on the same component handler.

11. The method of claim 8, wherein at least one of the component handlers cannot be executed until the resource indicates it is ready.

12. The method of claim 8, wherein the container orchestrator is Kubernetes.

13. The method of claim 8, wherein the list of component handlers includes at least one component handler corresponding to an in-memory database resource and at least one component handler corresponding to an in-memory database service resource.

14. The method of claim 8, wherein at least one component handler corresponding to the in-memory database resource includes a system password component handler, which changes a system password of a tenant database of a customer.

15. A non-transitory machine-readable medium storing instructions which, when executed by one or more processors, cause the one or more processors to perform operations comprising:
   running a main function in a in-memory database operator within a container orchestrator, the main function watching a cloud cluster for a creation, deletion, or modification of a resource, the resource containing a list of one or more requirements; and in response to the main function detecting a creation, deletion, or modification of the resource, calling a reconcile function, the reconcile function performing the operations of:

creating or modifying an instance of an in-memory database to match the requirements of the resource;

obtaining a list of a plurality of component handlers defined for the resource;

executing all of the component handlers in the list; and in response to a determination that any component handler does not report back as successful after a period of time, re-executing all of the component handlers in the list, until all component handlers in the list report back as successful.

16. The non-transitory machine-readable medium of claim 15, wherein the period of time is a different period of time each time the re-executing operation is performed on a same component handler.

17. The non-transitory machine-readable medium of claim 16, wherein the period of time grows exponentially each time the re-executing operation is performed on the same component handler.

18. The non-transitory machine-readable medium of claim 15, wherein at least one of the component handlers cannot be executed until the resource indicates it is ready.

19. The non-transitory machine-readable medium of claim 15, wherein the container orchestrator is Kubernetes.

20. The non-transitory machine-readable medium of claim 15, wherein the list of component handlers includes at least one component handler corresponding to an in-memory database resource and at least one component handler corresponding to an in-memory database service resource.

* * * * *